(12) United States Patent
Martins Florentino

(10) Patent No.: US 10,766,017 B2
(45) Date of Patent: Sep. 8, 2020

(54) METHOD FOR OBTAINING HYDROCARBON ABSORBER AND PRODUCT OBTAINED

(71) Applicant: BIOSOLVIT INDÚSTRIA, COMÉRCIO E DISTRIBUIÇÃO DE FIBRAS VEGETAIS E PRODUTOS DERIVADOS LTDA, Barra Mansa (BR)

(72) Inventor: Wagner Martins Florentino, Volta Redonda (BR)

(73) Assignee: BIOSOL VIT INDÚSTRIA, COMÉRCIO E DISTRIBUIÇÃO DE FIBRAS VEGETAIS E PRODUTOS DERIVADOS LTDA, Barra Mansa (BR)

( * ) Notice: Subject to any disclaimer, the term of this patent is extended or adjusted under 35 U.S.C. 154(b) by 185 days.

(21) Appl. No.: 16/080,070

(22) PCT Filed: Mar. 1, 2017

(86) PCT No.: PCT/BR2017/050043
§ 371 (c)(1),
(2) Date: Dec. 3, 2018

(87) PCT Pub. No.: WO2017/147675
PCT Pub. Date: Sep. 8, 2017

(65) Prior Publication Data
US 2019/0381479 A1 Dec. 19, 2019

(30) Foreign Application Priority Data
Mar. 1, 2016 (BR) .............. 102016004623

(51) Int. Cl.
*B01J 20/24* (2006.01)
*B01J 20/28* (2006.01)
*B01J 20/30* (2006.01)
*C09K 3/32* (2006.01)

(52) U.S. Cl.
CPC ......... *B01J 20/24* (2013.01); *B01J 20/28016* (2013.01); *B01J 20/28023* (2013.01); *B01J 20/3021* (2013.01); *B01J 20/3028* (2013.01); *B01J 20/3078* (2013.01); *C09K 3/32* (2013.01)

(58) Field of Classification Search
CPC B01J 20/24; B01J 20/28016; B01J 20/28023; B01J 20/3021; B01J 20/3028; B01J 20/3078; C09K 3/32
USPC ....................................... 502/402
See application file for complete search history.

(56) References Cited

U.S. PATENT DOCUMENTS 5,252,215 A 10/1993 McFarlane et al.

FOREIGN PATENT DOCUMENTS

| BR | 102012033306 A2 | 8/2014 |
| BR | 102012031354 A2 | 9/2014 |
| CN | 104624162 A | 5/2015 |
| EP | 0876758 A1 | 11/1998 |
| WO | 98/45018 A1 | 10/1998 |
| WO | 98/45535 A1 | 10/1998 |

OTHER PUBLICATIONS

International Search Report dated May 9, 2017 of corresponding International Application No. PCT/BR2017/050043; 7 pgs.

*Primary Examiner* — Edward M Johnson
(74) *Attorney, Agent, or Firm* — Maier & Maier, PLLC

(57) ABSTRACT

A method for producing a hydrocarbon absorber by extraction and processing of vegetable fibers from the Australian king palm (*Archontophoenix cunninghamiana*), discarded as waste by the agricultural industry and possessing a high hydrocarbon sorption and agglutination capacity in land environments.

3 Claims, 1 Drawing Sheet

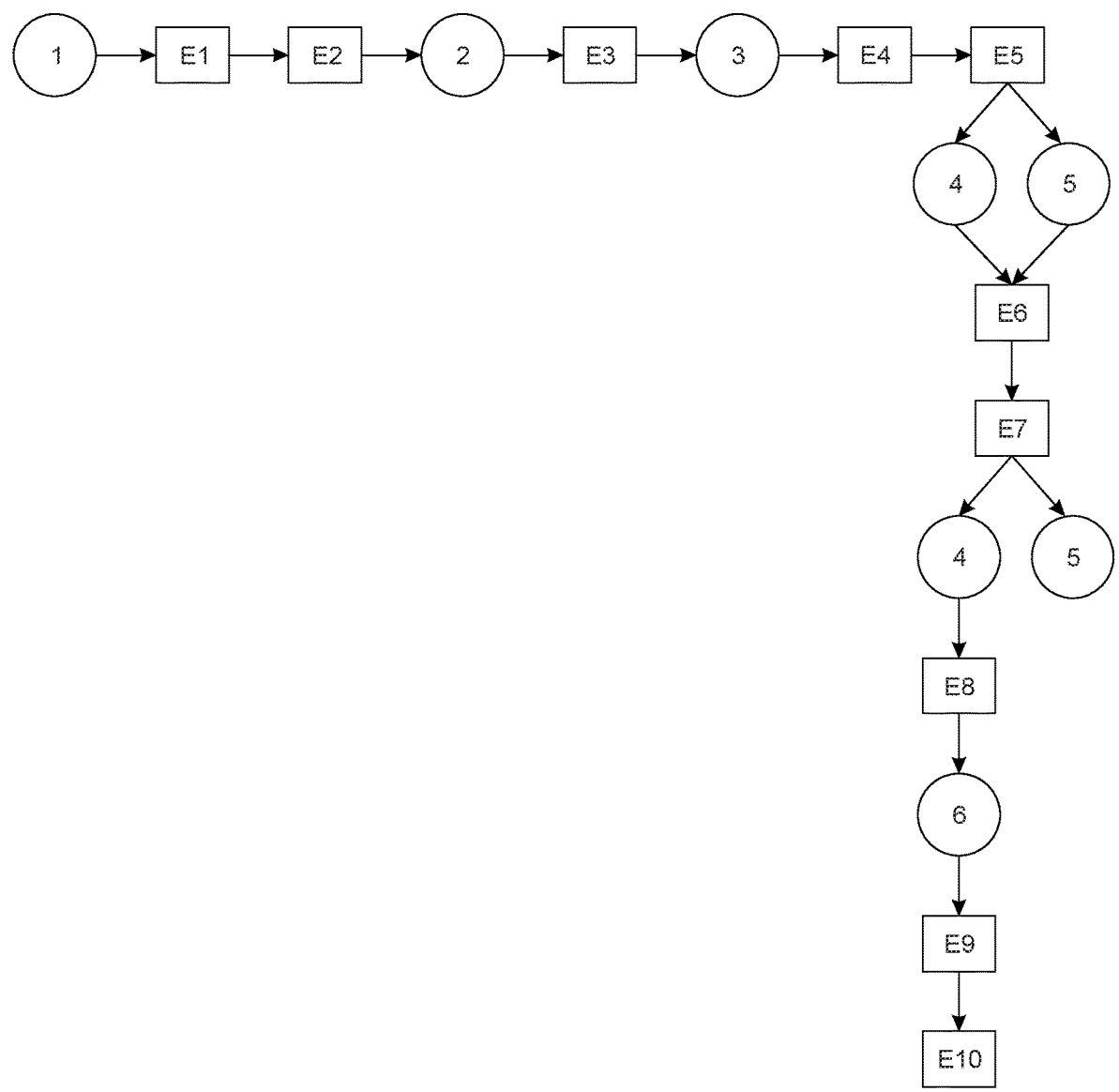

METHOD FOR OBTAINING HYDROCARBON ABSORBER AND PRODUCT OBTAINED

FIELD

This patent of invention relates to a novel Method for Obtaining Hydrocarbon Absorber and Product Obtained, which relates to a method for producing a hydrocarbon absorber from vegetable fibers from the Australian king palm to be used in leaks/spills of hydrocarbon in general, in land environment.

The present invention belongs to the field of chemistry, to chemical methods, more specifically to separation methods involving the processing of a liquid with solid sorbents, as it is a method for obtaining a product for hydrocarbon absorption in terrestrial environments.

BACKGROUND

The constant human industrialization and urbanization of mainly based especially on fossil fuels resulted in intense transformations and consequential environmental impact. In spite of the intense transformations caused mainly by the use of fossil fuels, their substitution by other fuels has been slow, since hydrocarbons are still the majority energy source; as the World Petroleum Industry has become the largest industry in the world today due to, among other factors, constant improvement and technological evolution in the sector.

The exploration of hydrocarbons can take place offshore, type of exploration that occurs far from the coast, in maritime environment; or onshore, type of exploration in terrestrial environments. Both types have their environmental advantages and risks, including the spill of these hydrocarbons in the environment from which they are being exploited.

Oil spills into the environment leave traces of degradation that most of the time could have been avoided. They reach animals, plants and humans, with minimal possibilities of effective recovery of some specimens hit due to the permanence of the toxic substances in the ecosystems. Unfortunately, such environmental disasters are more common than they should be; in order to try to minimize the negative impacts caused by them, some solutions are used after the spill/leak, being the use of microorganisms capable of degrading hydrocarbons and/or chemical/organic absorbing substances, which despite not fully and instantly repair the ecosystem, minimize the impact and enable it to recover gradually by removing the degrading agent.

In the current state of the art, there are certain patent documents referring to production methods and/or absorbent products with the ability to draw hydrocarbons, the current state of the art has a diverse literature on the subject but, in general, refers to the production of absorbent "sachets" or to products which are used for the absorption of offshore hydrocarbons, that is, in aquatic and marine environments.

BR102012033306-6, entitled "Composite Preparation Method for Oil Absorption and Adsorption, Product and Use", comprises the association of polystyrene (PS) super-hydrophobic nanomembranes with expanded exfoliated graphite in spiraled or milled form. The proposed nanomembranes have multiple function because they are hydrophobic, provide a medium for the adsorption of hydrocarbons, especially the petroleum, in addition, to provide a means of containment of the spiralized expanded graphite. In order to contain the spiralized expanded graphite, the super-hydrophobic polystyrene nanomembranes may also be deposited previously in cotton fibers, in the form of twill-like or fabric weave. Nanomembranes optimize the oil absorption capacity of the exfoliated graphite due to the high affinity for oil and do not absorb water from the medium. Furthermore, it is possible to associate PS super-hydrophobic nanomembranes in cotton fabrics to create the graphite containment medium. Said document proposes an oil absorbent composite, comprised of polystyrene and graphite, for absorption in marine environments, the present proposal in this patent application discloses the use of vegetable fiber prepared for hydrocarbon absorption in general in terrestrial environments.

Document BR102012031354-5, entitled "Method for obtaining hydrophobic fibers absorbing hydrocarbons and oils" refers to a method of production and the product obtained of hydrophobic absorbent fibers of hydrocarbons and oils, used to absorb oils and hydrocarbons, coming especially unconstrained from accidentally spilled oil in various aqueous environments, obtained through a specific method with natural feedstock, which prevents the production of a waste, and improves containment in the collection of spills. The absorbent product and its production method are based on the reincorporation to the market of a product made from organic fibers derived from bovine, equine or goat leather which, through a chemical and mechanical method, is denatured. As a result of this denaturation and with due chemical and physical processings, the fibers behave as an efficient hydrocarbon-absorbent product, which results in the purification of contaminated water from these chemical agents. In addition, this product proves to be a powerful absorber of oils and their oily derivatives of all type, mineral or vegetable ones, as well as of the toxic mineral oils of the electrical transformers. Said document proposes a product based on organic fibers, as well as the present patent application, but uses fibers of animal origin, which has been avoided a lot by the market, for reasons of protection and right of the animals.

In view of the above, it is observed that the proposal of a hydrocarbon absorber composed of vegetable fibers from cultivation and also agro-industrial waste completely meets the demand of a market concerned with environmental issues, besides solving environmental problems arising from spills/leakage of hydrocarbons in terrestrial soils.

SUMMARY

The objective of the present invention is that of offering to the market anabsorber produced from agricultural tailings and which is capable of sorting and agglutinating more hydrocarbons with a smaller amount of material and thereby minimizing the environmental impacts related to the disposal of waste; and, also, that presents lower financial cost related to its use and its final destination.

The present application relates to a method for obtaining absorber produced from the processing of Australian palm fibers (*Archontophoenix cunninghamiana*), an agro-industrial tailings, which has high sorption capacity and agglutination of hydrocarbons in terrestrial environments.

In short, the present invention provides the following main advantages:

Increased sorption capacity of oil/gram when compared to natural products in the market;

Simplicity in the method for obtaining the absorber;

Reduced environmental impact due to the fact that it is an agricultural waste, and because it presents a high sorption index, it generates less amount of residue after being used;

Best cost-benefit, either on sale or disposal, due to the greater sorption oil/gram.

BRIEF DESCRIPTION OF THE FIGURES

The invention will be described in a preferred embodiment, thus, for better understanding, references will be made to the accompanying flowchart.

FIG. 1: Flowchart of the method for obtaining hydrocarbon absorber.

DETAILED DESCRIPTION

The Method for Obtaining Hydrocarbon Absorbent and Product Obtained refers to the production method (FIG. 1) of hydrocarbon absorber from vegetable fibers, through the following methoding steps: the Australian palm (*Archontophoenix cunninghamiana*) (1) is removed (E.1) and cut (E.2) transversely by a circular saw, generally used in carpenters, and gives pellets (2) of approximately 5 cm in thickness and different diameters, according to the sawed stem. The pellets (2) are placed in an open environment for a period of one day on a cement floor, where the temperature oscillates between 25 and 50° C., so that the humidity is removed (E.3). After removal of the moisture (E.3), the dried pellets (3) are ground (E.4) in a hammer mill, so that their fibers can be removed, so the dried pellets (3) are placed through a conveyor belt directly in the mouth of the mill and passing through the hammers are dismembered (E.5) and give rise to two types of fibers, a finer type in powder form (4), which has different granulometry, and a type of long fiber (5) about 5 cm in length; only the powdered fiber (4) is used in this method. Then the two types of fiber (4 and 5) have their moisture removed (E.6) in a circular dryer and/or sieve, where initially the fibers (4 and 5) pass through the dryer tube for about one minute, at a temperature of 80° C., and then the two types of fibers (4 and 5) are separated (E.7), when passing through two circular sieves, one of approximately 1.65 mm granulometry where only the powdered fibers (4) pass and another sieve of approximately 5.11 mm where the long fibers (5) are withdrawn from this method to be used for other purposes. After separation (E.7) the powdered fibers (4) are exposed to the intense sun, where the temperature varies between 25 and 50° C., so that there is drying (E.8), until the present humidity is up to 15%, when the powdered fibers (4) are referred to as the absorber (6), the moisture test, for verification of 15%, is carried out with a moisture measuring device for biomass. After drying (E.8) until the desired moisture is obtained, the absorber (6) is packaged (E.9) with the use of a bagged bagger and stored (E.10) in a dry environment and at a room temperature.

In order to verify the effectiveness of the proposed absorber (6), an absorption yield test was performed, which was based on the change in mass of the absorber after being exposed to a load of crude oil of sufficient volume to saturate the sample. Three volumes of approximately 20 ml of the material were measured to raise the degree of certainty and to allow statistical data that will prove the efficacy of the product.

The samples had their mass measured, and the ratio between their mass and the predefined volume (20 ml) made it possible to determine the density of the samples, according to the following formula:

$$\text{density} = \frac{\text{mass}}{\text{volume}}$$

Afterwards, the samples were immersed in crude oil, with a higher volume for possible absorption in order to saturate the sample. After a period of 10 minutes of saturation of the material (immersed in crude oil), the samples were placed in a sieve to release a possible excess oil, the difference between the initial and the final mass of the samples represents the amount of oil absorbed in and absorption of the absorber.

The results were then subjected to statistical calculations to determine the amount of crude oil absorbed by the samples calculated using the following formula:

$$\text{yield} = \frac{\text{total absorved}}{\text{initial mass}}$$

Since the total absorbed is equal to the subtraction of the Final Mass by the Initial Mass, the total mass of crude oil is absorbed by one kilogram of the tested material.

| Sample Data (varied granulometry) | | | |
| --- | --- | --- | --- |
| no | Initial Mass (g) | Final Mass (g) | Total Absorbed (g) | Test Conditions |
| 1 | 2.3911 | 17.3166 | 14.9255 | 10 minutes in crude oil used under normal conditions of temperature and pressure. Absorption: 5.8 times |
| 2 | 2.2450 | 14.8677 | 12.6227 | |
| 3 | 2.5124 | 16.4525 | 13.9401 | |
| Average | 2.3828 | 16.4525 | 13.8229 | |

The value of 5.8 times its own valid weight proves the effectiveness of the natural source absorber for onshore leaks proposed in this patent application.

Preferably, for the absorption method, Australian royal palm fibers are used because they have shown better oil absorption results, however, fibers obtained from coconut, jute, sisal, sugar cane and macadam.

The invention claimed is:

1. A method for Obtaining Hydrocarbon Absorber and Product Obtained, comprising the following steps:
performing a withdrawal and transversal cut of a stem from an Australian king palm (*Archontophoenix cunninghamiana*), originating tablets of approximately 5 cm in thickness and various diameters having their moisture removed through environmental exposure; grinding dried pastilles in a hammer mill and dismembering them so that their fibers can be removed, and then drying, after dismembering, to form pellets, wherein the pellets originate two types of fibers, a finer type in powder form having a different size, and a long fiber type having a length of about 5 cm; then the two types of fiber have their moisture removed in circular dryer and/or sieve and then the two types of fiber are separated; after separation the powdered fiber is exposed to the sun so that its drying occurs and the powder becomes an absorber, which is packaged and stored.

2. The method for Obtaining Hydrocarbon Absorber and Product Obtained, according to claim 1, wherein the absorber exhibits humidity up to 15%.

3. The method for Obtaining Hydrocarbon Absorber and Product Obtained, according to claim 1, wherein the absorber exhibits absorption up to 5.8 times its mass.

* * * * *